US 9,527,054 B2

(12) United States Patent
Pham et al.

(10) Patent No.: US 9,527,054 B2
(45) Date of Patent: Dec. 27, 2016

(54) APPARATUSES AND METHODS FOR CRACKING HYDROCARBONS

(71) Applicant: UOP LLC, Des Plaines, IL (US)

(72) Inventors: Trung Pham, Mount Prospect, IL (US); Lev Davydov, Northbrook, IL (US); Lance Awender Baird, Prospect Heights, IL (US)

(73) Assignee: UOP LLC, Des Plaines, IL (US)

( * ) Notice: Subject to any disclaimer, the term of this patent is extended or adjusted under 35 U.S.C. 154(b) by 273 days.

(21) Appl. No.: 14/274,540

(22) Filed: May 9, 2014

(65) Prior Publication Data

US 2015/0322355 A1    Nov. 12, 2015

(51) Int. Cl.
*B01J 8/26* (2006.01)
*C10G 55/00* (2006.01)
(Continued)

(52) U.S. Cl.
CPC .. *B01J 8/26* (2013.01); *C10G 3/42* (2013.01); *C10G 51/06* (2013.01); *C10G 55/00* (2013.01); *C10G 69/00* (2013.01); *B01J 2208/00991* (2013.01); *C10G 2300/1014* (2013.01); *C10G 2300/1077* (2013.01); *C10G 2300/4056* (2013.01); *Y02P 30/20* (2015.11)

(58) Field of Classification Search
CPC .................. C10G 51/06; C10G 2300/1014
See application file for complete search history.

(56) References Cited

U.S. PATENT DOCUMENTS

| | | | | |
|---|---|---|---|---|
| 4,606,810 A | * | 8/1986 | Krambeck | C10G 51/026 208/113 |
| 4,874,503 A | * | 10/1989 | Herbst | C10G 57/02 208/120.15 |

(Continued)

FOREIGN PATENT DOCUMENTS

| | | | | |
|---|---|---|---|---|
| CN | 101314724 B | 3/2013 | | |
| WO | WO 2008127956 A1 | * | 10/2008 | C10G 11/18 |

OTHER PUBLICATIONS

Chen, et al., "Influence of Blending Vegetable Oil Into Hvgo on Hydrotreating/Mild Hydrocracking Performance," AIChE—2012 AIChE Spring Meeting and 8th Global Congress on Process Safety, Conference Proceedings, ISBN-13:9780816910717, Apr. 1, 2012-Apr. 5, 2012, Publisher: American Institute of Chemical Engineers.

(Continued)

*Primary Examiner* — Randy Boyer

(57) ABSTRACT

Methods and apparatuses are provided for cracking a hydrocarbon. The method includes contacting a first hydrocarbon stream with a first cracking catalyst at a first cracking temperature in a first riser to produce a first riser effluent and a first spent catalyst. A second hydrocarbon stream is contacted with a second cracking catalyst at a second cracking temperature in a second riser to produce a second riser effluent and a second spent catalyst, where the second cracking temperature is less than the first cracking temperature. The first riser effluent and the second riser effluent are combined to produce a mixed riser effluent, and the mixed riser effluent is fractionated in a fractionation zone to produce a light cycle oil. The first spent catalyst and the second spent catalyst are combined in a reactor to produce a mixed spent catalyst.

20 Claims, 1 Drawing Sheet

(51) Int. Cl.
*C10G 51/06* (2006.01)
*C10G 69/00* (2006.01)
*C10G 3/00* (2006.01)

(56) References Cited

U.S. PATENT DOCUMENTS

| | | | |
|---|---|---|---|
| 5,009,769 A * | 4/1991 | Goelzer | C10G 51/06 208/113 |
| 5,565,176 A * | 10/1996 | Johnson | C10G 11/18 422/140 |
| 6,866,771 B2 * | 3/2005 | Lomas | B01J 8/0055 208/113 |
| 7,041,259 B2 | 5/2006 | Cammy et al. | |
| 7,491,315 B2 * | 2/2009 | Eng | C10G 11/18 208/113 |
| 7,540,952 B2 * | 6/2009 | Pinho | C10G 11/05 208/108 |
| 7,550,634 B2 | 6/2009 | Yao et al. | |
| 8,231,777 B2 * | 7/2012 | Silva | C10G 11/18 208/108 |
| 8,541,636 B2 | 9/2013 | Vergel | |
| 2011/0224471 A1 | 9/2011 | Wormsbecher et al. | |
| 2011/0258916 A1 | 10/2011 | Baldiraghi et al. | |
| 2013/0001130 A1 * | 1/2013 | Mo | C10G 11/18 208/79 |
| 2013/0130889 A1 * | 5/2013 | Gbordzoe | B01J 21/08 502/77 |
| 2013/0178672 A1 * | 7/2013 | Chen | C10G 1/002 585/240 |
| 2013/0276360 A1 | 10/2013 | Boon et al. | |
| 2013/0289324 A1 | 10/2013 | Price et al. | |
| 2014/0275675 A1 * | 9/2014 | Eng | C07C 1/20 585/303 |
| 2015/0136647 A1 * | 5/2015 | Krishnaiah | C10G 51/026 208/74 |

OTHER PUBLICATIONS

Marker, et al., "Opportunities for Biorenewables in Oil Refineries," ACS Division of Fuel Chemistry, Preprints, v 50, n 2, p. 679-680, 2005, ISSN: 05693772, Conference: ACS Fuel Chemistry Meeting, Fall 2005, Publisher: American Chemical Society.

Malleswara Rao, et al., "Fluid Catalytic Cracking: Processing Opportunities for Fischer-Tropsch Waxes and Vegetable Oils to Produce Transportation Fuels and Light Olefins," Microporous and Mesoporous Materials, v 164, p. 148-163, Dec. 1, 2012, ISSN: 13871811, DOI: 10.1016/j.micromeso.2012.07.016, Publisher: Elsevier.

* cited by examiner

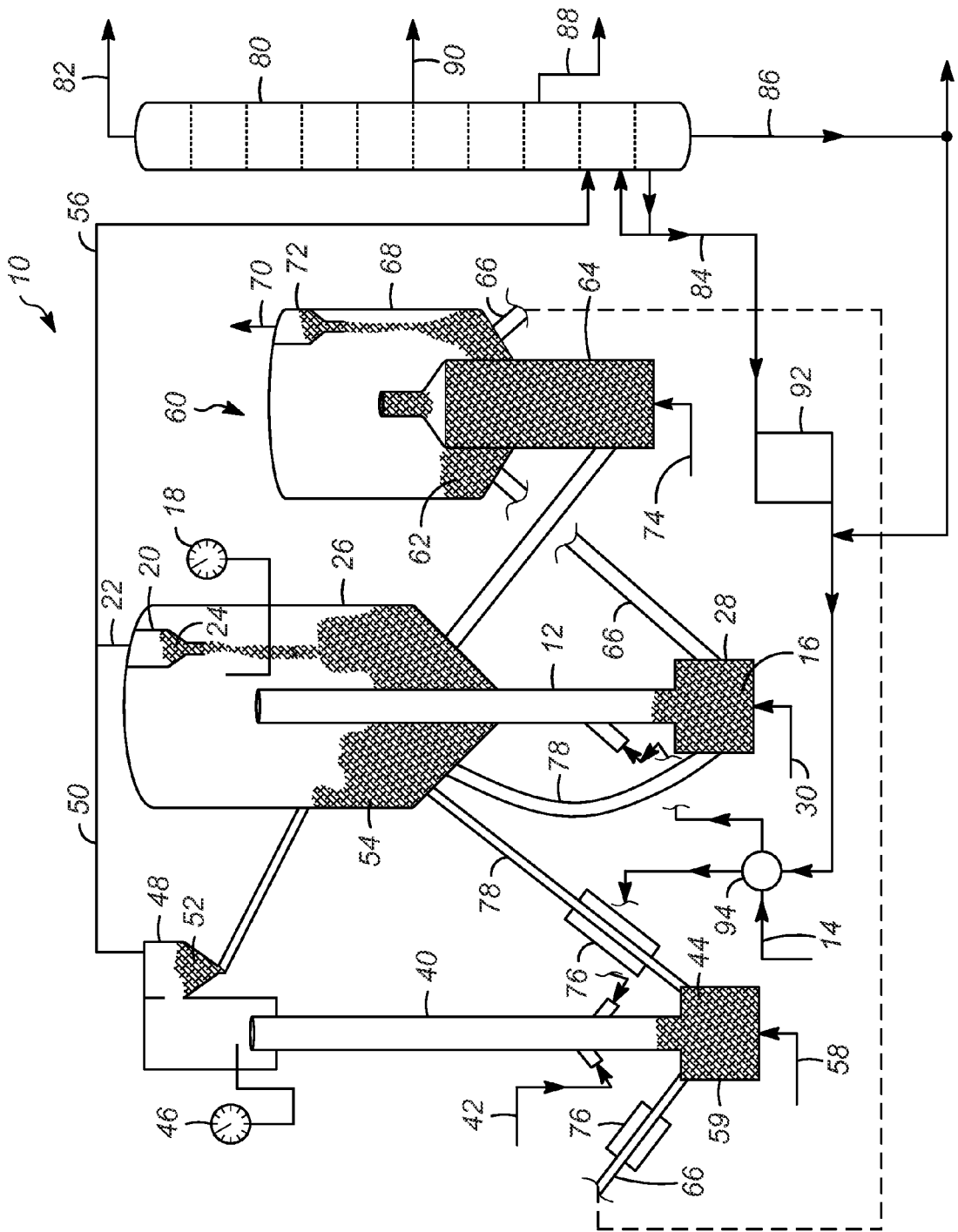

APPARATUSES AND METHODS FOR CRACKING HYDROCARBONS

TECHNICAL FIELD

The present disclosure generally relates to apparatuses and methods for cracking hydrocarbons, and more particularly relates to apparatuses and methods for cracking natural oils with petroleum hydrocarbons.

BACKGROUND

Fluid catalytic cracking (FCC) is primarily used to convert high boiling, high molecular weight hydrocarbons from petroleum into lower boiling, lower molecular weight compounds. The lower molecular weight compounds include gasoline, olefinic compounds, liquid petroleum gas (LPG), diesel fuel, etc., where the feedstock and the operating conditions can be adjusted to improve yields of a desired product. Hydrocarbons are cracked with a catalyst in a riser in an FCC unit, coke deposits on the catalyst in the riser, and the coke is burned in a regenerator to regenerate the catalyst. The catalyst is repeatedly cycled through the riser and regenerator while cracking hydrocarbons.

There is high demand for diesel fuel, and there is also a high desire to use renewable feedstocks for fuel. The FCC unit can convert some petroleum feedstocks into diesel fuel, such as vacuum gas oil, but the resulting diesel fuel often has a low cetane number. Renewable feedstocks, such as natural oils that include triglycerides and/or fatty acids, can also be converted into diesel fuel in an FCC unit, and the resulting diesel fuel often has a high cetane number. Vegetable oil is a renewable feedstock, but the supply of vegetable oil is limited so the amount of fuel that can be produced from vegetable oil is also limited. Diesel fuel from vacuum gas oil can be combined with diesel fuel from vegetable oil to produce a product with an acceptable cetane number for use as diesel fuel, and the resulting diesel fuel is partially produced from a renewable feedstock. However, vegetable oil needs to be processed in the FCC unit at a lower severity than vacuum gas oil or similar feedstocks to maximize the production of diesel fuel, so co-processing vegetable oil and vacuum gas oil results in reduced yields over separate processing. It is difficult to economically justify dedicating an FCC unit to processing vegetable oil because of the limited supply, and sequential processing may require additional storage facilities, reduced output for downtime between different feedstocks, and a more complicated production schedule. However, due to environmental impacts and regulations, refiners may want to process a certain amount of feedstocks that are allocated to renewable resources.

Accordingly, it is desirable to develop methods and apparatuses for co-processing vegetable oil and petroleum based feedstocks in an FCC unit. In addition, it is desirable to develop methods and apparatuses for co-processing vegetable oil and petroleum based feedstocks in an FCC unit where the vegetable oil is processed at a lower severity than the petroleum based feedstock. Furthermore, other desirable features and characteristics of the present embodiment will become apparent from the subsequent detailed description and the appended claims, taken in conjunction with the accompanying drawing and this background.

BRIEF SUMMARY

An apparatus and method are provided for cracking hydrocarbons. The method includes contacting a first hydrocarbon stream with a first cracking catalyst at a first cracking temperature in a first riser to produce a first riser effluent and a first spent catalyst. A second hydrocarbon stream is contacted with a second cracking catalyst at a second cracking temperature in a second riser to produce a second riser effluent and a second spent catalyst, where the second cracking temperature is less than the first cracking temperature. The first riser effluent and the second riser effluent are combined to produce a mixed riser effluent, and the mixed riser effluent is fractionated in a fractionation zone to produce a light cycle oil. The first spent catalyst and the second spent catalyst are combined in a reactor to produce a mixed spent catalyst.

In another embodiment of a method for cracking hydrocarbons, a first hydrocarbon stream is contacted with a first cracking catalyst in a first riser to produce a first riser effluent, and a second hydrocarbon stream is contacted with a second cracking catalyst in a second riser to produce a second riser effluent. The first and second riser effluents are combined to produce a mixed riser effluent, and the mixed riser effluent is fractionated to produce a heavy cycle oil and a light cycle oil. One or more of the heavy cycle oil or the light cycle oil is fed into one or more of the first riser or the second riser.

In another embodiment, an apparatus is provided for cracking hydrocarbons. The apparatus includes a first riser coupled to a first catalyst separator, and a reactor coupled to the first catalyst separator. A second riser is coupled to a second catalyst separator, and the second catalyst separator is also coupled to the reactor. A fractionation zone is coupled to the first and second risers, and a regenerator is coupled to the reactor, the first riser, and the second riser.

BRIEF DESCRIPTION OF THE DRAWINGS

Various embodiments will hereinafter be described in conjunction with the FIGURE, which is a schematic diagram of an exemplary embodiment of an apparatus and method for cracking hydrocarbons, wherein like numerals denote like elements.

DETAILED DESCRIPTION

The following detailed description is merely exemplary in nature and is not intended to limit the application or uses of the embodiment described. Furthermore, there is no intention to be bound by any theory presented in the preceding technical field, background, brief summary, or the following detailed description.

Apparatuses and methods for cracking two different hydrocarbon streams at different process conditions are provided, where one of the hydrocarbon streams may be a natural oil. Exemplary embodiments include an FCC unit having two risers, one for each hydrocarbon stream, and each riser operates at different process conditions appropriate for different feedstocks to produce a product. The catalyst from both risers is combined in a single reactor while the vaporous riser effluent from each riser is combined and fed to a single fractionation zone. A regenerator is connected to the reactor to regenerate the catalyst, and the reactor and the regenerator provide catalyst to the risers for the cracking reaction. The fractionation zone produces the product, so one reactor, one regenerator, and one fractionation zone can service two different risers operating at different conditions. As such, capital costs and operating costs for processing two different streams in an FCC unit are reduced compared to operating two separate FCC units.

In accordance with an exemplary embodiment and referring to the FIGURE, an FCC unit 10 includes a first riser 12, a second riser 40, a regenerator 60, and a fractionation zone 80. A first hydrocarbon stream 14 is introduced to the first riser 12 for cracking. The first hydrocarbon stream 14 is a petroleum product in an exemplary embodiment, but the first hydrocarbon stream 14 may alternatively be a natural oil, a chemical by-product, or other materials in alternate embodiments. Suitable hydrocarbon feedstocks for the first hydrocarbon stream 14 include, but are not limited to, petroleum products such as vacuum gas oil (VGO), hydrotreated VGO, atmospheric distillation column bottoms, demetallized oil, deasphalted oil, hydrocracker main column bottoms, Fischer-Tropsch liquids derived from renewable or non-renewable feedstocks, triglycerides of vegetable or animal origin, and the like. In some embodiments, the first hydrocarbon stream 14 has an initial boiling point of about 300 degrees centigrade (° C.) or higher (at atmospheric pressure), and is a material that can vaporize and flow. In many embodiments, the first hydrocarbon stream 14 will be a mixture of different compounds, so it will have a boiling range instead of a single boiling point, where the boiling range begins at the initial boiling point described above. In some embodiments, the hydrocarbons have an average molecular weight of about 200 to about 600 Daltons or higher.

The first hydrocarbon stream 14 is contacted with a first cracking catalyst 16 in the first riser 12. The first cracking catalyst 16 can be a wide variety of cracking catalysts as is known in the art. Suitable cracking catalysts for use herein include high activity crystalline alumina silicate and/or zeolite, which may be dispersed in a porous inorganic carrier material such as silica, alumina, zirconia, or clay. An exemplary embodiment of a cracking catalyst includes crystalline zeolite as the primary active component, a matrix, a binder, and a filler. The zeolite ranges from about 10 to about 50 mass percent of the catalyst, and is a silica and alumina tetrahedral with a lattice structure that limits the size range of hydrocarbon molecules that can enter the lattice. The matrix component includes amorphous alumina, and the binder and filler provide physical strength and integrity. Silica sol or alumina sol are used as the binder and kaolin clay is used as the filler. Different cracking catalysts may be used in alternate embodiments.

The hydrocarbons from the first hydrocarbon stream 14 are discharged into a low portion of the first riser 12, where the hydrocarbons in the first hydrocarbon stream 14 primarily react (crack) in the first riser 12. The hydrocarbons are vaporized and carried up through the first riser 12 with the first cracking catalyst 16. The first cracking catalyst 16 is fluidized in the first riser 12 by a first lift gas 30, where the first lift gas 30 may include one or more of steam, light hydrocarbons, nitrogen, or other gases. The first hydrocarbon stream 14 is typically introduced into the first riser 12 as a liquid, and the hydrocarbons are vaporized by heat from the hot first cracking catalyst 16. As the vaporized hydrocarbons and first cracking catalyst 16 rise up through the first riser 12, the hydrocarbons are contacted with the cracking catalyst and cracked into smaller hydrocarbons.

In an exemplary embodiment, the first riser 12 operates at a first cracking temperature 18 of from about 510° C. to about 540° C. (about 950 degrees Fahrenheit (° F.) to about 1,000° F.), such that many of the cracked hydrocarbons are diesel boiling range compounds. The first cracking temperature 18 is measured in the vaporous stream at or near the outlet of the first riser 12, where "near the outlet" is defined to mean within about 1 meter of the outlet. Diesel boiling range compounds have a boiling point from about 150° C. to about 380° C. at atmospheric pressure (about 300° F. to about 720° F.). In an alternate embodiment, the first cracking temperature 18 is from about 480° C. to about 570° C. (about 900° F. to about 1,050° F.). Operating pressures in the first riser 12 may be from about 100 kilo Pascals gauge (kPa) to about 250 kPa (about 15 pounds per square inch gauge (PSIG) to about 35 PSIG). More severe operating conditions (higher temperatures and/or pressures) tend to produce smaller molecules with lower boiling points, so more severe operating conditions may be used when the desired end product is a lower boiling compound, such as gasoline or propylene. The operating conditions may vary depending on several factors, including but not limited to the feedstock in the first hydrocarbon stream 14, the first cracking catalyst 16, residence time in the first riser 12, catalyst loading in the first riser 12, the desired product, etc. The first riser 12 is generally designed for a given feedstock and production rate, so the size, flow rate, and proportions can vary widely. In an exemplary embodiment, the first riser 12 is designed for a first hydrocarbon stream 14 residence time of from about 0.5 to about 10 seconds, but other residence times are also possible. The first hydrocarbon stream 14 may be heated to a temperature of from about 150° C. to about 450° C. (300° F. to 850° F.) before entry into the first riser 12.

In an exemplary embodiment, the first hydrocarbon stream 14 and first cracking catalyst 16 travel up the first riser 12 to a first catalyst separator 20 fluidly coupled to the first riser 12. The vaporous hydrocarbons exit the first catalyst separator 20 in a first riser effluent 22 and the catalyst exits the first catalyst separator 20 as a first spent catalyst 24. Coke is deposited on the catalyst in the first riser 12 such that the catalyst is at least partially coated with coke when exiting the first riser 12. As such, the first cracking catalyst 16 becomes partially deactivated in the first riser 12 to produce the first spent catalyst 24. The first catalyst separator 20 may be one or more cyclones, impingement separators, or other gas/solid separators. The first spent catalyst 24 is discharged to a reactor 26 fluidly coupled to the first catalyst separator 20, and the first riser effluent 22 flows to a fractionation zone 80, discussed below.

A second riser 40 operates in a similar manner to the first riser 12. A second hydrocarbon stream 42 is contacted with a second cracking catalyst 44 in the second riser 40. In an exemplary embodiment, the second hydrocarbon stream 42 includes a natural oil, such that about 75 mass percent or more of the second hydrocarbon stream 42 is glycerides, fatty acids, or combinations of the two. Most of the glycerides may be triglycerides, but monoglycerides and diglycerides may be present and processed as well. Natural oils are available from a wide variety of sources, including but not limited to canola oil, corn oil, rapeseed oil, soybean oil, colza oil, tall oil, sunflower oil, hempseed oil, olive oil, linseed oil, coconut oil, castor oil, peanut oil, palm oil, mustard oil, camelina oil, pennycress oil, tallow, yellow and brown greases, lard, train oil, jatropha oil, fats in milk, fish oil, algal oil, sewage sludge, and the like. Additional examples of natural oils include non-edible vegetable oils, such as oils from *Madhuca indica* (mahua), *Pongamia pinnata*, and *Azadirachta indica* (neem).

The second hydrocarbon stream 42 may also include a co-feed, or a mixture of natural oils and petroleum derived hydrocarbons. Other feedstock components that may be used, especially as a co-feed component in combination with the above listed natural oils, include but are not limited to spent motor oils and industrial lubricants; used paraffin waxes; liquid derived from the gasification of coal, biomass, or natural gas followed by a downstream liquefaction step such as Fischer-Tropsch technology; liquids derived from depolymerization (thermal or chemical) of waste plastics such as polypropylene, high density polyethylene, and low density polyethylene; and other synthetic oils generated as byproducts from petrochemical and chemical processes. Mixtures of the above feedstocks may also be used as co-feed components. One advantage of using a co-feed component is that what may have been a waste product is transformed into a valuable product. In other embodiments, the second hydrocarbon stream 42 is essentially all petroleum derived hydrocarbons, as described for the first hydrocarbon stream 14 above, and the first hydrocarbon stream 14 includes a natural oil, as described for the second hydrocarbon stream 42 above, such that the feeds to the first and second risers 12, 40 can be switched such that the reactor 26 is coupled to the riser with the natural oil feed.

The second cracking catalyst 44 may be essentially the same type as the first cracking catalyst 16 described above, with possible minor differences in the ratio of spent, regenerated, and fresh catalyst, as described below. The hydrocarbons in the second hydrocarbon stream 42 are reacted as they are transported through the second riser 40 by a second lift gas 58, as described for the first riser 12 above. The second lift gas 58 is the same or similar to the first lift gas 30 described above. The second riser 40 operates at a second cracking temperature 46 (measured at or near the exit of the second riser 40), and the second cracking temperature 46 is different than the first cracking temperature 18 in some embodiments. For example, in an embodiment where the second hydrocarbon stream 42 is a natural oil and the first hydrocarbon stream 14 is a VGO, the second cracking temperature 46 may be less than the first cracking temperature 18. In this embodiment, the second cracking temperature 46 may be from about 480° C. to about 510° C. (about 900° F. to about 950° F.). In some embodiments, the first cracking temperature 18 may be from about 15° C. to about 40° C. (about 25° F. to about 75° F.) higher than the second cracking temperature 46. The lower cracking temperature is better suited to producing diesel boiling range products from natural oils, and the higher cracking temperature is better suited to produce diesel boiling range products from VGO's and many other petroleum based oils. The operating pressures and residence times in the second riser 40 are about the same as for the first riser 12, as described above. The second riser 40 may be designed based on an expected feed rate for the second hydrocarbon stream 42, and the feed rate for the second hydrocarbon stream 42 may depend on the expected availability of natural oils or other feedstocks. The second hydrocarbon stream 42 may be heated to a temperature of from about 150° C. to about 450° C. (300° F. to 850° F.) before entry into the second riser 40, as described for the first riser 12 above.

The second hydrocarbon stream 42 and second cracking catalyst 44 travel up the second riser 40 to a second catalyst separator 48 fluidly connected to the second riser 40. The vaporous hydrocarbons exit the second catalyst separator 48 in a second riser effluent 50 and the catalyst exits the second catalyst separator 48 as a second spent catalyst 52. Alternatively, the discharge from the second riser 40 may be transferred into the first catalyst separator 20 or into the reactor 26. As such, the first and second spent catalysts 24, 52 and the first and second riser effluents 22, 50 may be combined and co-mingled within the reactor 26 and/or the first catalyst separator 20, so the first and second riser effluents 22, 50 are separated from the first and second spent catalysts 24, 52 in the first catalyst separator 20. Coke is deposited on the catalyst in the second riser 40, as described above for the first riser 12, such that the catalyst is at least partially coated with coke. The second catalyst separator 48 may include one or more cyclones, impingement separators, or other gas/solid separators. The second spent catalyst 52 is discharged from the second catalyst separator 48 (or from the first catalyst separator 20) into the reactor 26, where it is combined with the first spent catalyst 24 to form a mixed spent catalyst 54. As such, the reactor 26 is fluidly coupled to the first riser 12 and the second riser 40, and may be fluidly coupled through the first catalyst separator 20 and the second catalyst separator 48. The second riser effluent 50 is combined with the first riser effluent 22 to produce a mixed riser effluent 56 that flows to the fractionation zone 80. The first and second riser effluents 22, 50 may be combined within the reactor 26 or outside of the reactor 26 in various embodiments.

Mixed spent catalyst 54 is transferred to the regenerator 60 to burn off the coke and thereby regenerate the catalyst, so the reactor 26 is fluidly coupled to the regenerator 60. Coke is burnt off the mixed spent catalyst 54 in a coke combusting zone 64 to produce regenerated catalyst 62 that is collected in a regenerator separation area 68. An oxygen supply gas 74 is coupled to the coke combusting zone 64 and carries the fluidized mixed spent catalyst 54 through the coke combusting zone 64 into the regenerator separation area 68. The coke is burned off the mixed spent catalyst 54 by contact with the oxygen supply gas 74 at regeneration conditions. In an exemplary embodiment, air is used as the oxygen supply gas 74, because air is readily available and provides sufficient $O_2$ for combustion, but other gases with a sufficient concentration of $O_2$ could also be used, such as purified $O_2$. If air is used as the oxygen supply gas 74, about 10 to about 15 kilograms (kg) of air is required per kg of coke burned off of the mixed spent catalyst 54. Exemplary regeneration conditions include a temperature from about 500° C. to about 900° C. (900° F. to 1,700° F.) and a pressure of about 150 kPa to about 450 kPa (20 PSIG to 70 PSIG). The superficial velocity of the oxygen supply gas 74 is typically less than about 2 meters per second (6 feet per second), and the density within the coke combusting zone 64 is typically about 80 to about 400 kilograms per cubic meter (about 5-25 lbs. per cubic foot). However, the regenerator 60 may be designed and sized based on the expected duty, so the regenerator may be larger or smaller than as described above.

Combustion gases, such as carbon dioxide, carbon monoxide, and water are produced as the coke is burned off. The combustion gases and other excess gases may be vented from the regenerator separation area 68 through a regenerator vent line 70. A regenerator catalyst separator 72 may aid in separating the regenerated catalyst 62 from the combustion gases before the combustion gases are vented. The combustion of coke is an exothermic reaction, so the catalyst is heated as it is regenerated, and the regenerated catalyst 62 is hotter than the mixed spent catalyst 54. In an exemplary embodiment, the regenerated catalyst 62 has a temperature of about 600° C. to about 760° C. (about 1,100° F. to about 1,400° F.). The regenerated catalyst 62 is then transferred to the first riser 12 and the second riser 40, and is included in the first cracking catalyst 16 and the second cracking catalyst 44.

The hydrocarbon cracking reaction is endothermic, and heat is required to vaporize the hydrocarbons from the first hydrocarbon stream 14 and the second hydrocarbon stream 42. In some embodiments, the heat is primarily supplied by the regenerated catalyst 62 that enters the first and second risers 12, 40 at an elevated temperature, and the regenerated catalyst 62 is heated by combusting coke in the regeneration process. As such, the FCC unit 10 may be about energy neutral, in that the energy used to vaporize and crack the hydrocarbons is primarily provided by the energy released from regenerating the catalyst. In an exemplary embodiment, about 70 percent of the heat used in the first and second risers 12, 40 is used to vaporize the hydrocarbon feed streams with about 30 percent used to drive the endothermic cracking reaction, depending on the operating conditions and the composition of the feed streams.

In many embodiments, the first cracking catalyst 16 and the second cracking catalyst 44 each include regenerated catalyst 62 provided from the regenerator 60, and may also include mixed spent catalyst 54. Therefore, the regenerator 60 may be fluidly coupled to the first and second risers 12, 40, either directly or indirectly. Fresh catalyst can also be used in some embodiments. In an alternate embodiment, the first cracking catalyst 16 and/or the second cracking catalyst 44 may include first spent catalyst 24 and/or second spent catalyst 52 that are returned to the first and/or second riser 12, 40 before combining the first and second spent catalysts 24, 52. The mixed spent catalyst 54 may be blended with the regenerated catalyst 62 in a first blending vessel 28 at or near the bottom of the first riser 12. The first lift gas 30 fluidizes the first cracking catalyst 16, which is a mixture of regenerated catalyst 62 and mixed spent catalyst 54 in some embodiments, and the first lift gas 30 then carries the first cracking catalyst 16 through the first riser 12. The second cracking catalyst 44 may be similarly produced by combining the regenerated catalyst 62 and the mixed spent catalyst 54 in a second blending vessel 59, and fluidizing the second cracking catalyst 44 with the second lift gas 58. The ratio of mixed spent catalyst 54 and regenerated catalyst 62 may be from about 0.1/1 to about 5/1 for the first and second cracking catalysts 16, 44. However, in alternate embodiments, the first and/or second cracking catalysts 16, 44 include fresh catalyst, do not include spent catalyst, or include compositions other than as described above.

The second cracking catalyst 44 may be at a lower temperature than the first cracking catalyst 16 within the second and first risers 40, 12, so the second cracking temperature 46 will be lower than the first cracking temperature 18, as described above. In alternate embodiments, the first cracking temperature 18 is lower than the second cracking temperature 46, also as described above. In one embodiment, the temperature of the first and second cracking catalysts 18, 46 is determined by the ratio of mixed spent catalyst 54 and regenerated catalyst 62 transferred to the first and second blending vessel 28, 59, where higher concentrations of regenerated catalyst 62 tend to produce higher temperatures. In an alternate embodiment, a catalyst cooler 76 is used to cool the catalyst transported to the first and/or second riser 12, 40. The catalyst cooler 76 may be at one or more of several positions, including the reactor transfer line 78 extending from the reactor 26 to the first or second blending vessel 28, 59, the regenerator transfer line 66 extending from the regenerator 60 to the first or second blending vessel 28, 59, on the regenerator 60 itself, or attached to the first or second blending vessel 28, 59 itself. Catalyst coolers 76 may provide different amounts of cooling to the first and second cracking catalysts 16, 44 so the temperatures in the first and second risers 12, 40 are different. In an exemplary embodiment, steam is used as the coolant in the catalyst cooler 76, and superheated steam is discharged. As can be seen, there are several ways to control the temperature in the risers, including mixing the first and/or second spent catalyst 24, 52 with the regenerated catalyst 62, and the different methods can be used alone or in combination in various embodiments. The temperature of the first and second cracking catalyst 16, 44 may be about 540° C. to about 760° C. (about 1,000° F. to about 1,400° F.) in various embodiments.

The first and second cracking catalysts 16, 44 may be provided by combining the mixed spent catalyst 54 with the regenerated catalyst 62, as described above, and this provides several advantages. Combining the mixed spent catalyst 54 with the regenerated catalyst 62 allows for better temperature control in the first and second risers 12, 40, and facilitates a higher catalyst density in the first and second risers 12, 40 because more catalyst can be fed to the first and second blending vessels 28, 59. In some embodiments, more energy is used in the first and second risers 12, 40 than is produced in the regenerator 60. The use of mixed spent catalyst 54 tends to produce more coke on the mixed spent catalyst 54, and the additional coke increases the exothermic heat load during catalyst regeneration and may thereby aid in maintaining energy neutrality in the FCC unit 10. The mixed spent catalyst 54 is not entirely deactivated, as described above. The use of mixed spent catalyst 54 in the first and second cracking catalysts 16, 44 may improve selectivity in the cracking process, which may reduce overcracking into molecules with molecular weights below those in the diesel boiling range.

The mixed riser effluent 56 is fed into a fractionation zone 80 that separates the mixed riser effluent 56 into various fractions based on the volatility of the hydrocarbon molecules, so the fractionation zone 80 is fluidly coupled to the first and second risers 12, 40 either directly or indirectly. A wide variety of operating conditions can be used in the fractionation zone 80 in different embodiments, such as maintaining a pressure from about 100 kPa to about 200 kPa (14 PSIG to 30 PSIG) and a temperature of about 80° C. to about 140° C. (180° F. to 280° F.) at the overhead. The fractionation zone 80 includes one or more distillation columns, and the operating conditions can vary. The lightest compounds with the highest vapor pressures and lowest boiling points are discharged from the fractionation zone 80 in an overhead stream 82. A heavy cycle oil 84 is discharged from near the bottom of a distillation column in the fractionation zone 80, and a slurry oil 86 is discharged from the bottom. The heavy cycle oil 84 and the slurry oil 86 include the heaviest compounds with the highest boiling points, where the slurry oil 86 may include small particles of catalyst that were inadvertently carried into the fractionation zone 80 with the mixed riser effluent 56. The fractionation zone 80 typically produces one or more side cut streams, such as light cycle oil 88, naphtha 90, or others. In an exemplary embodiment, the light cycle oil 88 is a diesel boiling range stream as described above, and the first and second risers 12, 40 are operated at conditions designed to maximize or produce relatively large quantities of hydrocarbons in the diesel boiling range, as described above. The diesel boiling range product may be removed from the fractionation zone 80 in an alternate side cut in other embodiments. The light cycle oil 88, naphtha 90 and other products from the fractionation zone 80 may be sold, further processed, or otherwise used in other petrochemical or chemical processing facilities.

In an exemplary embodiment, the heavy cycle oil 84 is collected and combined with one or more of the first hydrocarbon stream 14 or the second hydrocarbon stream 42. The heavy cycle oil 84 may be processed in a hydrotreater 92 prior to being combined with the first and/or second hydrocarbon stream 14, 42 to increase the hydrogen content and thereby improve the catalytic cracking performance. Hydrotreating is a well known process, and involves contacting the heavy cycle oil 84 and hydrogen gas with a hydrotreating catalyst at hydrotreating conditions. In an exemplary embodiment, hydrotreating conditions in the hydrotreater 92 are a temperature of from about 290° C. to about 400° C., and a pressure of from about 20 to about 140 atmospheres. The reaction conditions are generally more severe as the hydrotreating catalyst ages and becomes less active, and for hydrocarbon streams with higher boiling points, where more severe reaction conditions include higher temperatures and/or pressures. Oxygen atoms that may be present in the heavy cycle oil 84 reacts with the hydrogen gas to produce water, and sulfur compounds or nitrogen compounds that may be present in the heavy cycle oil 84 may also be reacted to form hydrogen sulfide and ammonia, respectively. Double bonds in some aromatic compounds in the heavy cycle oil 84 may be saturated, so the hydrogen content is increased. The gases are then separated from the heavy cycle oil 84, and excess hydrogen gas may be recovered and re-used in the hydrotreater 92.

In an exemplary embodiment, the hydrotreating catalyst includes a Group VI and/or Group VIII active metal component on a support, where the support may be a porous refractory oxide including, but not limited to, alumina, alumina-silica, silica, zeolites, titania, zirconia, boria, magnesia, and their combinations. Supports other than refractory oxides are also possible in various embodiments. In some embodiments, other metals are included in the hydrotreating catalyst in addition to or in place of the Group VI and/or Group VIII metals, such as cobalt, nickel, or other metals. For example, metals that may be used in the hydrotreating catalyst include molybdenum, ruthenium, cobalt, nickel, tungsten, and combinations thereof. Hydrotreating catalysts can be prepared by combining the active metals with the support. The supports, which may contain metal components, are typically dried and calcined at temperatures ranging from about 370° C. to about to 600° C. to eliminate any solvent and to convert metals to the oxide form, but other catalyst preparation processes are also possible. The calcined metal oxide catalysts may be reacted with sulfur to produce a metal sulfide, such as by contact with a sulfur containing compound including but not limited to hydrogen sulfide, organo sulfur compounds or elemental sulfur.

The heavy cycle oil 84 may also be used with a preheater 94 to preheat one or more of the first and second hydrocarbon streams 14, 42. The slurry oil 86 may optionally be combined with the heavy cycle oil 84, but the slurry oil 86 is not be hydrotreated in some embodiments. Therefore, the slurry oil 86 may be combined with the heavy cycle oil 84 downstream from the hydrotreater 92, or the slurry oil 86 may be discharged from the FCC unit 10 and otherwise processed or used. In an alternate embodiment, there heavy cycle oil 84 is a component of the slurry oil 86, and there is no heavy cycle oil 84 stream separate from the slurry oil 86 stream. As such, the heavy cycle oil 84 may be recycled or otherwise used, as described above, by recycling or otherwise using the slurry oil 86 stream. In an exemplary embodiment, the heavy cycle oil 84 is processed with the second hydrocarbon stream 42 in the second riser 40, where the heavy cycle oil 84 aids in lowering the temperature in the second riser 40. The heavy cycle oil 84 may be mixed with the second hydrocarbon stream 42 prior to entering the second riser 40, but in some embodiments the heavy cycle oil 84 is charged into the second riser 40 such that the hot second cracking catalyst 44 contacts the heavy cycle oil 84 before contacting the second hydrocarbon stream 42. The catalyst to oil ratio in the second riser 40 may be somewhat reduced by adding the heavy cycle oil 84 in some embodiments, so the temperature in the second riser 40 is lower. In embodiments where the heavy cycle oil 84 is added to the second riser 40 before the second hydrocarbon steam 42, the second cracking catalyst 44 is cooled as it heats and vaporizes the heavy cycle oil 84. Therefore, the second cracking catalyst 44 is cooler when it contacts the second hydrocarbon stream 42 than when it contacts the heavy cycle oil 84. In embodiments where the second hydrocarbon stream 42 is a natural oil, this can improve yields and reduce excessive cracking of the natural oil because it is not exposed to the second cracking catalyst 44 until it has been cooled somewhat by the heavy cycle oil 84. In yet another embodiment, a light cycle oil 88 or other process streams can be introduced into the second riser 40 (or the first riser 12 if the natural oil is fed into the first riser 12) in place of or in addition to the heavy cycle oil 84.

Natural oils produce less coke than many petroleum based feedstocks, and natural oil feedstocks may not produce enough coke to maintain an energy balance in the FCC unit 10. Recycling the heavy cycle oil 84 and/or slurry oil 86 may improve coke yields to increase the heat produced in the regenerator 60. Recycling the heavy cycle oil 84 and/or slurry oil 86 may also improve the overall yield of diesel boiling range products, because the heavy cycle oil 84 and slurry oil 86 typically have too high a boiling point for a diesel boiling range fuel and catalytic cracking can produce some diesel boiling range molecules from the heavy cycle oil 84 and slurry oil 86 materials.

One skilled in the art will recognize that an FCC unit 10 with more than two risers utilizing the same reactor 26, regenerator 60, and fractionation zone 80 is possible if more than two different hydrocarbon feed streams are co-processed. As such, this description is intended to include FCC units 10 with two or more risers.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the application in any way. Rather, the foregoing detailed description will provide those skilled in the art with a convenient road map for implementing one or more embodiments, it being understood that various changes may be made in the function and arrangement of elements described in an exemplary embodiment without departing from the scope, as set forth in the appended claims.

The invention claimed is:

1. A method of cracking hydrocarbons comprising:
    contacting a first hydrocarbon stream with a first cracking catalyst at a first cracking temperature in a first riser to produce a first riser effluent and a first spent catalyst;
    contacting a second hydrocarbon stream with a second cracking catalyst at a second cracking temperature in a second riser to produce a second riser effluent and a second spent catalyst, wherein the second cracking temperature is less than the first cracking temperature and the second hydrocarbon stream comprises about 75 mass percent or more of glycerides, fatty acids or combinations thereof;
    combining the first riser effluent and the second riser effluent to produce a mixed riser effluent;
    combining the first spent catalyst and the second spent catalyst in a reactor to produce a mixed spent catalyst; and fractionating the mixed riser effluent in a fractionation zone to produce a light cycle oil.

2. The method of claim 1 wherein the second hydrocarbon stream comprises a natural oil.

3. The method of claim 2 wherein fractionating the mixed riser effluent comprises producing a heavy cycle oil, the method of claim 2 further comprising:
combining the heavy cycle oil with the second hydrocarbon stream in the second riser.

4. The method of claim 1 wherein:
the first cracking temperature is from about 15 degrees centigrade to about 40 degrees centigrade higher than the second cracking temperature.

5. The method of claim 1 further comprising:
regenerating the mixed spent catalyst in a regenerator to produce a regenerated catalyst; and
transferring the regenerated catalyst to the first riser and to the second riser.

6. The method of claim 5 further comprising:
combining the mixed spent catalyst with the regenerated catalyst to produce the first cracking catalyst.

7. The method of claim 1 further comprising:
separating the first riser effluent from the first spent catalyst in a first catalyst separator prior to combining the first riser effluent with the second riser effluent; and
separating the second riser effluent from the second spent catalyst in a second catalyst separator prior to combining the first riser effluent with the second riser effluent.

8. The method of claim 1 wherein the first hydrocarbon stream has an initial boiling point of about 300 degrees centigrade or more.

9. A method of cracking hydrocarbons comprising:
contacting a first hydrocarbon stream with a first cracking catalyst in a first riser to produce a first riser effluent;
contacting a second hydrocarbon stream with a second cracking catalyst in a second riser to produce a second riser effluent;
combining the first riser effluent with the second riser effluent to produce a mixed riser effluent;
fractionating the mixed riser effluent in a fractionation zone to produce a heavy cycle oil and a light cycle oil;
feeding one or more of the heavy cycle oil or the light cycle oil into one or more of the first riser or the second riser; and
hydrotreating the heavy cycle oil prior to feeding the heavy cycle oil into one or more of the first riser or the second riser.

10. The method of claim 9 further comprising:
preheating one or more of the first hydrocarbon stream or the second hydrocarbon stream with the heavy cycle oil.

11. The method of claim 9 further comprising:
separating the first riser effluent from a first spent catalyst;
separating the second riser effluent from a second spent catalyst; and
combining the first spent catalyst with the second spent catalyst to produce a mixed spent catalyst.

12. The method of claim 11 further comprising:
regenerating the mixed spent catalyst in a regenerator to produce a regenerated catalyst; and
feeding the regenerated catalyst to the first riser and to the second riser.

13. The method of claim 12 further comprising:
combining the mixed spent catalyst with the regenerated catalyst to form the first cracking catalyst.

14. The method of claim 9 wherein:
feeding one or more of the heavy cycle oil or the light cycle oil into one or more of the first riser or the second riser comprises feeding the heavy cycle oil into the second riser; and
the second hydrocarbon stream comprises a natural oil.

15. The method of claim 9 wherein the second hydrocarbon stream comprises about 80 mass percent or more glycerides, fatty acids, or combinations of the two.

16. The method of claim 9 wherein the first hydrocarbon stream has an initial boiling point of about 300 degrees centigrade or more.

17. The method of claim 9 wherein the light cycle oil has a boiling temperature from about 150 degrees centigrade to about 380 degrees centigrade at atmospheric pressure, such that the light cycle oil is a diesel boiling range hydrocarbon stream.

18. A method of cracking hydrocarbons comprising:
contacting a first hydrocarbon stream with a first cracking catalyst in a first riser to produce a first riser effluent;
contacting a second hydrocarbon stream with a second cracking catalyst in a second riser to produce a second riser effluent;
combining the first riser effluent with the second riser effluent to produce a mixed riser effluent;
fractionating the mixed riser effluent in a fractionation zone to produce a heavy cycle oil and a light cycle oil; and
feeding one or more of the heavy cycle oil or the light cycle oil into one or more of the first riser or the second riser;
separating the first riser effluent from a first spent catalyst;
separating the second riser effluent from a second spent catalyst; and
combining the first spent catalyst with the second spent catalyst to produce a mixed spent catalyst;
regenerating the mixed spent catalyst in a regenerator to produce a regenerated catalyst;
feeding the regenerated catalyst to the first riser and to the second riser; and
combining the mixed spent catalyst with the regenerated catalyst to form the first cracking catalyst.

19. The method of claim 18 further wherein:
feeding one or more of the heavy cycle oil or the light cycle oil into one or more of the first riser or the second riser comprises feeding the heavy cycle oil into the second riser; and
the second hydrocarbon stream comprises a natural oil.

20. The method of claim 18 further comprising:
preheating one or more of the first hydrocarbon stream or the second hydrocarbon stream with the heavy cycle oil.

\* \* \* \* \*